G. ADSIT.
CLUTCH.
APPLICATION FILED JUNE 2, 1917.
1,280,623.
Patented Oct. 8, 1918.
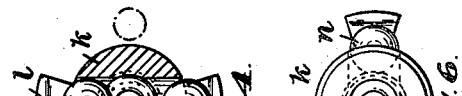

UNITED STATES PATENT OFFICE.

GEORGE ADSIT, OF PATERSON, NEW JERSEY, ASSIGNOR TO THE BENJAMIN EASTWOOD COMPANY, OF PATERSON, NEW JERSEY, A CORPORATION OF NEW JERSEY.

CLUTCH.

1,280,623.        Specification of Letters Patent.        Patented Oct. 8, 1918.

Application filed June 2, 1917. Serial No. 172,422.

*To all whom it may concern:*

Be it known that I, GEORGE ADSIT, a citizen of the United States, residing at Paterson, in the county of Passaic and State of New Jersey, have invented certain new and useful Improvements in Clutches, of which the following is a specification.

This invention relates to clutches, and particularly to that class of clutches in which a centrifugally acting clutching element or elements are employed. The invention is useful and may be used in various applications, but it has been applied by me and is herein shown in connection with a mechanism for winding quills, wherein it is very desirable to have the driven member, as the quill spindle, "picked up" gradually by the driving member before the engagement between the two becomes positive, thus to ease the starting of the driven element and so reduce to the minimum the breakage of the thread being wound, which result requires with clutching means now employed the greatest skill and care on the part of the operator, especially if the thread be weak.

In the drawing,

Figure 1 is a plan view of one winding unit of a quilling machine;

Fig. 2 is a plan of the clutch, the clutch elements of the driving member being shown in their fully outward positions;

Fig. 3 is a longitudinal sectional view of the driving member as it appears when in a state of rest;

Fig. 4 is a transverse sectional view thereof;

Fig. 5 is a longitudinal sectional view of the driving member in another plane; and, Fig. 6 is an end elevation of the driving member, its clutch elements being in their fully outward positions.

The mechanism shown in Fig. 1, except for the clutching means thereof, is the same as in my Patent No. 919,298. There is a bearing *a* for the shaft *b* of the driving member, one end of such shaft carrying a pulley *c* driven by the belt *d* and the other being provided with the clutch member to be described. The spindle *e* is journaled in a suitable bearing in the breast-rail *f* and in the shaft *b* axially thereof and has a cross-head *g* forming a fixed part thereof. On the spindle slides a fork *h* whose arms, *i*, (parallel with the axis of the shaft *b* and spindle) are round in cross-section and slide in the cross-head when shifted by any means, as the shifter *j*. At the inside each arm *i* of fork *h* forms a tapping face to coact with the tapping faces of a clutch member on shaft *b*, as will appear.

Secured on shaft *b*, as by screw-threading, is a clutch-head *k* formed with radial lugs *l* and with a transverse bore *m*, each lug being somewhat bent off so as slightly to overhang the adjoining end of the bore. In the bore are two balls *n* spaced by the intervening spindle *e* (which penetrates an axial hole *k'* in the clutch-head) and capable of radial movement from contact with the shaft *b* at *o*—upper ball, Figs. 3 and 4— to contact with the lugs *l*—lower ball, Figs. 3 and 4,—which lugs confine them in the bore. The surface of each ball also forms a tapping face.

It will be now seen that if, by the shifter *j*, the fork be shifted from the full-line to the dotted line position in Fig. 2 while the shaft *b* and its clutch device are rotating, the fork *h* will be ultimately caught by the lugs *l*, forming a positive interlock between the shaft and spindle and causing the latter to rotate with and at the same speed as the former. But in the act of effecting this positive interlock a slipping hold is first obtained by the spindle on the shaft through the clutch members thus: Centrifugal force drives the balls *n* outward and when the shifter is operated to "close" the clutch the arms *i* of the fork come into the orbits of the balls which by tapping against them (on each impact or tap being cammed radially inwardly by the inward rounded faces of said arm) impel the fork and hence the spindle around. The operator soon learns to effect the shifting so that before the positive interlock is established the spindle is by the centrifugally influenced balls brought to rotate at a speed more or less nearly the same as that of the drive shaft *b*.

My invention, so far as I am aware, contains novelty regardless of the shifting of one member into or out of engagement with the other, and regardless of the clutching being made ultimately positive in nature, and I therefore am not necessarily limited to these features, what I claim being:

1. The combination of rotary driving and driven clutch members journaled on substantially the same axis and respectively having outwardly and inwardly facing coengaging tapping faces, the part of the driving member having the outwardly facing tapping face being centrifugally shiftable from one to the other of two paths concentric with said axis and respectively inwardly clear of and interrupted by the other tapping face, and one of said faces being disposed camwise with relation to the other.

2. The combination of rotary driving and driven clutch members journaled on substantially the same axis and respectively having outwardly and inwardly facing coengaging tapping faces, the part of the driving member having the outwardly facing tapping face being centrifugally shiftable from one to the other of two paths concentric with said axis and respectively inwardly clear of and interrupted by the other tapping face and having said outwardly facing tapping face substantially rounded.

3. The combination of rotary driving and driven clutch members journaled on substantially the same axis and respectively having outwardly and inwardly facing coengaging tapping faces, the part of the driving member having the outwardly facing tapping face being a ball centrifugally shiftable from one to the other of two paths concentric with said axis and respectively inwardly clear of and interrupted by the other tapping face.

4. The combination of a driving clutch member and a driven clutch member journaled on a common axis and having coengaging clutch elements, the clutch element of the driving member being a centrifugally shiftable part thereof adapted to have slipping engagement with the clutch element of the driven member, one of said members being capable of movement longitudinally of said axis, and the driving member having means to positively interlock it with the driven member on such movement.

In testimony whereof I affix my signature.

GEORGE ADSIT.